United States Patent
Harn et al.

(10) Patent No.: US 11,636,122 B2
(45) Date of Patent: Apr. 25, 2023

(54) METHOD AND APPARATUS FOR DATA MINING FROM CORE TRACES

(71) Applicant: Futurewei Technologies, Inc., Plano, TX (US)

(72) Inventors: YwhPyng Harn, Milpitas, CA (US); Xiaotao Chen, Basking Ridge, NJ (US); Fa Yin, Pudong (CN)

(73) Assignee: Futurewei Technologies, Inc., Addison, TX (US)

( * ) Notice: Subject to any disclaimer, the term of this patent is extended or adjusted under 35 U.S.C. 154(b) by 542 days.

(21) Appl. No.: 14/983,934

(22) Filed: Dec. 30, 2015

(65) Prior Publication Data

US 2017/0193055 A1 Jul. 6, 2017

(51) Int. Cl.
*G06F 16/2458* (2019.01)
*G06F 11/30* (2006.01)
*H04L 41/14* (2022.01)
*H04L 41/16* (2022.01)
(Continued)

(52) U.S. Cl.
CPC ...... *G06F 16/2465* (2019.01); *G06F 11/3037* (2013.01); *G06F 11/348* (2013.01); *G06F 11/3433* (2013.01); *G06F 11/3438* (2013.01); *G06F 11/3476* (2013.01);
(Continued)

(58) Field of Classification Search
None
See application file for complete search history.

(56) References Cited

U.S. PATENT DOCUMENTS

| | | | |
|---|---|---|---|
| 6,223,186 B1 * | 4/2001 | Rigault | G16B 50/00 707/603 |
| 7,904,487 B2 * | 3/2011 | Ghatare | G06F 17/30427 707/756 |
| 8,543,367 B1 | 9/2013 | Van Rompaey et al. | |

(Continued)

FOREIGN PATENT DOCUMENTS

| CN | 1766848 A | 5/2006 |
|---|---|---|
| CN | 101246449 A | 8/2008 |

(Continued)

OTHER PUBLICATIONS

Charles Reiss; Heterogeneity and Dynamicity of Clouds at Scale: Google Trace Analysis; 2012; SOCC; pp. 1-13 (Year: 2012).*

(Continued)

*Primary Examiner* — Amresh Singh
*Assistant Examiner* — Jermaine A Mincey
(74) *Attorney, Agent, or Firm* — Vierra Magen Marcus LLP

(57) ABSTRACT

According to an embodiment, there is provided a method for data mining from core traces in a processing system for wireless baseband design that includes detecting a core trace in the processing system where the core trace is a sequence of instructions executed in the processing system. Instruction addresses in the core trace are mapped to a plurality of application or operating system functions. The mapped functions are sorted into a hierarchical format. A gene function is identified in the hierarchical format where the gene function is a fundamental function executed by the processing system. Attributes for the gene function are derived from the hierarchical format. The attributes are stored into a gene function library database.

17 Claims, 11 Drawing Sheets

(51) Int. Cl.
  *H04W 4/60*   (2018.01)
  *G06F 11/34*  (2006.01)
(52) U.S. Cl.
  CPC ............ *H04L 41/145* (2013.01); *H04L 41/16* (2013.01); *H04W 4/60* (2018.02)

(56) References Cited

U.S. PATENT DOCUMENTS

| | | | |
|---|---|---|---|
| 2004/0225629 A1* | 11/2004 | Eder | G06N 5/022 |
| | | | 706/45 |
| 2005/0065969 A1* | 3/2005 | Thomas | G16B 50/00 |
| 2005/0080791 A1 | 4/2005 | Ghatare | |
| 2006/0074970 A1* | 4/2006 | Narayanan | G06F 11/3419 |
| 2007/0043531 A1 | 2/2007 | Kosche et al. | |
| 2007/0203883 A1* | 8/2007 | Lutterkort | G06F 17/3041 |
| 2010/0123575 A1* | 5/2010 | Mittal | H04L 41/0609 |
| | | | 340/540 |
| 2013/0346046 A1 | 12/2013 | Rompaey et al. | |
| 2014/0195480 A1* | 7/2014 | Talagala | G06F 12/0804 |
| | | | 707/610 |
| 2015/0154021 A1* | 6/2015 | Padmanabha | G06F 9/30058 |
| | | | 712/239 |
| 2016/0072800 A1* | 3/2016 | Soon-Shiong | H04L 63/0861 |
| | | | 726/7 |
| 2018/0329873 A1* | 11/2018 | Butyugin, IV | G06F 40/143 |

FOREIGN PATENT DOCUMENTS

| | | |
|---|---|---|
| CN | 103425565 A | 12/2013 |
| CN | 103530471 A | 1/2014 |
| KR | 20110084458 A | 7/2011 |
| WO | 03056429 A2 | 7/2003 |
| WO | 2007135490 A1 | 11/2007 |

OTHER PUBLICATIONS

PCT/CN2016/113076, ISR, Mar. 31, 2017.
European Search Report dated Dec. 6, 2018 in European Patent Application No. EP16881261, 9 pages.
Office Action dated Jun. 27, 2019, in Korean Patent Application No. 10-2018-7021601, 4 pages.
CN 201680077507.4—Office Action dated Mar. 11, 2020, 5 pages.

* cited by examiner

[6,+] LBB_ULDSP_PUSCH_RuuMainProc (APP) (167) (6550 675131 176030112)
⋮
[7] LBB_ULDSP_PUSCH_RuuMainProc (APP) (19) (6552 675420 176030401)
⋮
[7] LBB_ULDSP_PUSCH_RuuMainProc (APP) (19) (6554 675561 176030542)
⋮
[7] LBB_ULDSP_PUSCH_RuuMainProc (APP) (19) (6556 675561 176030683)

[6,-] LBB_ULDSP_PUSCH_RuuMainProc (APP) (131) (6646 678453 176033434)

METHOD AND APPARATUS FOR DATA MINING FROM CORE TRACES

TECHNICAL FIELD

The present disclosure relates in general to computer system behavior analysis and more particularly to a method and apparatus for data mining from core traces.

BACKGROUND

Next generation wireless system designs require reliable and accurate system performance and behavior. In order to design a next generation system, such as a 5G system, acquiring information related to current system behavior and analysis is crucial and indispensable in understanding current system operation. Current techniques on system behavior and performance analysis are inefficient in obtaining accurate system behavior and performance parameters necessary for application in the exploration and implementation of 5G systems.

SUMMARY

From the foregoing, it may be appreciated by those skilled in the art that a need has arisen for a technique to analyze system behavior for next generation designs. In accordance with the present disclosure, a method and apparatus for data mining from core traces are provided that greatly reduce or substantially eliminate problems and disadvantages associated with current coding techniques on system behavior analysis.

According to an embodiment, there is provided a method for data mining from core traces in a processing system for wireless baseband design that includes detecting a core trace in the processing system where the core trace is a sequence of instructions executing in the processing system. Instruction addresses in the core trace are mapped to a plurality of application or operating system functions. The mapped functions are sorted into a hierarchical format. A gene function is identified in the hierarchical format where the gene function is a fundamental function executed by the processing system. Attributes for the gene function are derived from the hierarchical format. The attributes are stored into a gene function library database.

The present disclosure describes many technical advantages over conventional system behavior and performance analysis techniques. For example, one technical advantage is to build an infrastructure of accurate system performance parameters. Another technical advantage is to identify individual behavior of core functions executing in the system. Other technical advantages may be readily apparent to and discernable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION

Figure 1:
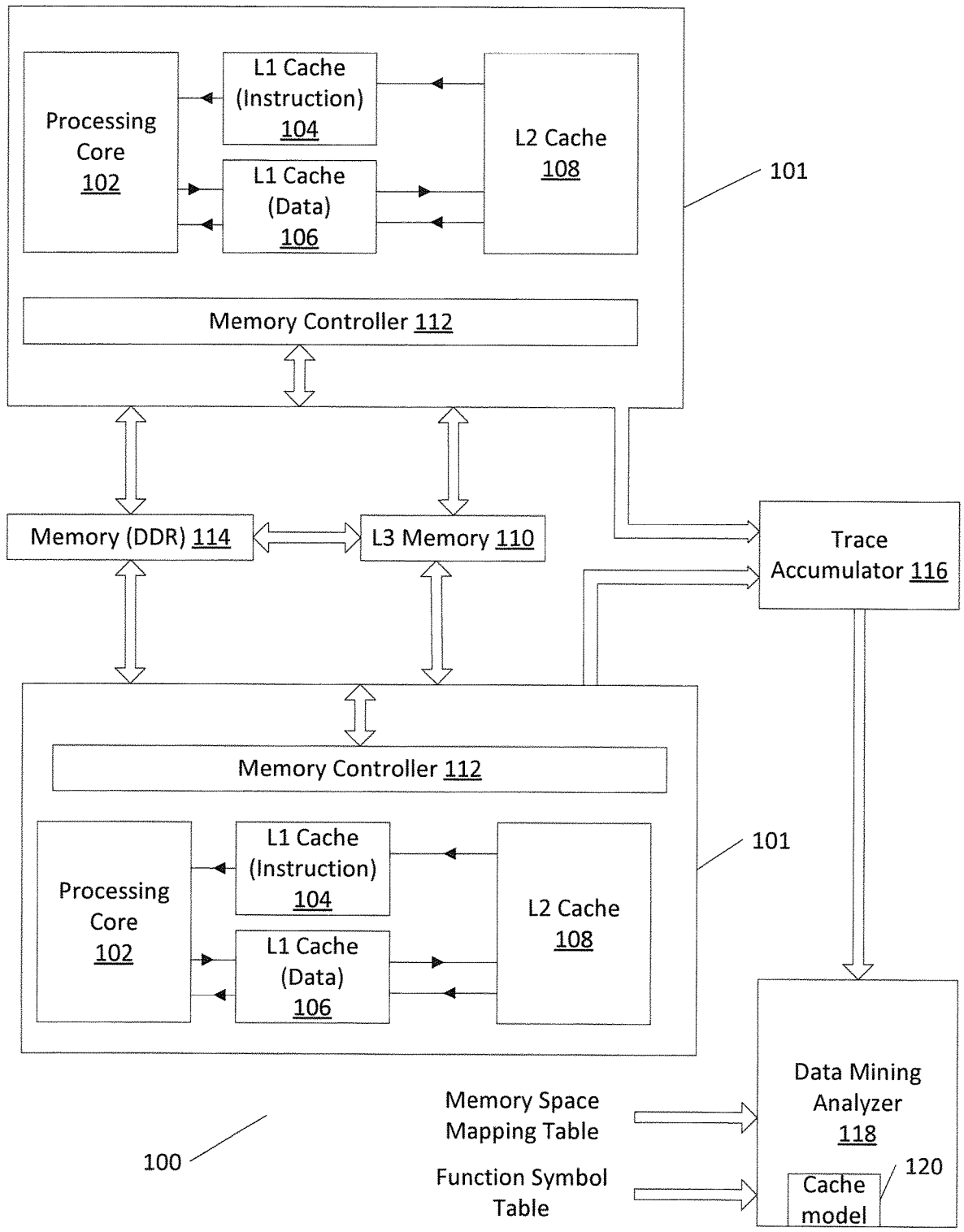
FIG. 1 illustrates an example of a processing device.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the disclosure may be implemented in any type of suitably arranged device or system. Features shown and discussed in one figure may be implemented as appropriate in one or more other figures.

An approach of 'data mining' from core traces is presented to derive and acquire information on system behavior and performance. Acquired information is obtained directly from core traces like 'Load' (i.e., 'Read') and 'Store' (i.e., 'Write') counts, while derived information is obtained after feeding the trace into some analytical models (such as a Cache model to get cache miss counts, throughput from Cache to memory, etc.). Core traces provide a record of the execution of a sequence of instructions, memory addresses affected by the instructions, and values contained in the memory addresses. Data mining from core traces provide system information that can aid in improving the design of the next-generation systems. An infrastructure based on core traces is built to obtain accurate and reliable system performance and behavior of a current system and gain insights for the next generation system design. Example attributes associated with system performance and behavior include load/store densities, cache miss counts, memory profiling, data throughput, core workload estimation, power usage estimation, and preemption detection and cost analysis.

The present disclosure provides a technique to analyze data load/store operations from core traces, including data location (for example, a Level 2 (L2) memory and/or cache, a Level 3 (L3) memory and/or cache, and a Double Data Rate (DDR) memory) and size of the data in the memory. A cache model is implemented to evaluate cache miss counts based on the data load/store information. Memory profiling, data throughput, workload, power usage, etc., are evaluated from the information gleaned from the data load/store operations and cache miss counts. Preemption events are detected and the related costs are analyzed.

Data mining is used for analysis of system behavior and performance. Core traces, including cache traces, data transfer traces, and direct memory access traces, are detected and stored for analysis. Cache traces provide information on instruction addresses, time stamps of instruction execution, load (read) and store (write) operations, data location, and data size, as well as other information related to system performance. Data transfer traces provide information on load and store operations, data location and size, and time stamps when data is transferred to and from a hardware accelerator. Direct memory access traces provide information on source data addresses, destination data addresses, data size, and time stamps.

FIG. 1 shows an example of a computing system 100. Computing system 100 includes a plurality of processing devices 101. Each processing device 101 includes a processing core 102. Processing core 102 has a dedicated L1 instruction cache 104, a L1 data cache 106, and a L2 cache 108. Computing system 100 may also include a L3 memory 110 shared by processing devices 101 or separate L3 memories dedicated to each processing device 101 as desired. Each processing device 101 includes a memory controller 112 for controlling access to cache memories within processing device 101 and external memories coupled to processing device 101 such as L3 memory 110 and a DDR memory 114. A trace accumulator 116 is included in computing system 100 to detect and store core traces upon execution of instructions by each processing device 101. Trace accumulator 116 provides core traces to a trace analyzer 118 to perform data mining as discussed below.

A memory space mapping table is generated by a system design compiler (not shown) according to an amount of memory accessible by processing device 101. The memory space mapping table describes the sizes and address ranges of memory spaces (as provided by the L2 cache 108, the L3 memory 110, and the DDR memory 114) so that a determination can be made as to where the data comes from according to its address. The memory space mapping table is an input to data mining analyzer 118. An example of a memory space table is provided in TABLE I.

TABLE I

| Memory Space | Address Range |
| --- | --- |
| L2 | 0x08000000-0x0807ffff |
| L3 | 0x9a000000-0x9bffffff |
| DDR | 0xa0000000-0xdfffffff |

A function symbol table is also generated by the system design compiler and provided as an input to data mining analyzer 118. Function symbol tables map each instruction address in the trace to an application or operating system (OS) function. Data mining analyzer 118 uses the function symbol table and the traces received by trace accumulator 116 for analyzing the instruction processing performed by processing devices 101. An example function symbol table is shown in TABLE II.

TABLE II

| Symbol Name | Symbol Address | Size |
| --- | --- | --- |
| DAGC | 0x091a62a0 | 0x0000002d |
| RUUInv | 0x0923a1e0 | 0x000004c8 |
| FFTDataIn | 0x0903a13b | 0x000002d1 |

A cache model 120 may be implemented in data mining analyzer 118 for analysis and synthesis of traces. A cache model 120 provides cache miss analysis, pre-cache data flow, post-cache data flow, and core workload analysis. The parameters used to specify a cache model 120 can include line size (in bytes), number of lines, number of ways, pre-fetch mode (on or off), pre-fetch buffer size, and write policy (such as write-through, write-back, write-back no allocation).

Each processing device 101 may be implemented as a digital signal processor. A typical example of a cache model for a digital signal processor (DSP) core in wireless communications models the behavior of a cache having a total data size of 64K bytes with 128 lines, 128 bytes of line size and 4 ways. In this case, a replace least recently used (RPL_LRU) policy is used to replace a cache line when a load miss happens. The write-back no allocation (WBNA) policy is used for a store operation. Other cache model examples may be used depending on the design of processing device 101. Data mining analyzer 118 incorporates a model of the caches used in processing device 101 for processing and analyzing the traces obtained by trace accumulator 116.

The input to the cache model 120 includes the instructions in the trace from trace accumulator 116, each providing a data address and size. An output includes a cache miss or hit. In the case of a cache miss, the output also includes a size and address of data loaded to the cache, a size and address of data fetched to a prefetch buffer if the 'prefetch' mode is on, and a size and address of data (from the evicted cache line) written back to memory if it becomes dirty (i.e., has been overwritten). The cache model can be used for simulating the behavior of a L1 data cache (D-Cache) 106, a L1 instruction cache (I-Cache) 104, a L2 cache 108, and a L3 memory 110. While FIG. 1 shows multiple processing devices 101, computing system 100 may comprise only a single processing device 101.

Figure 2A:
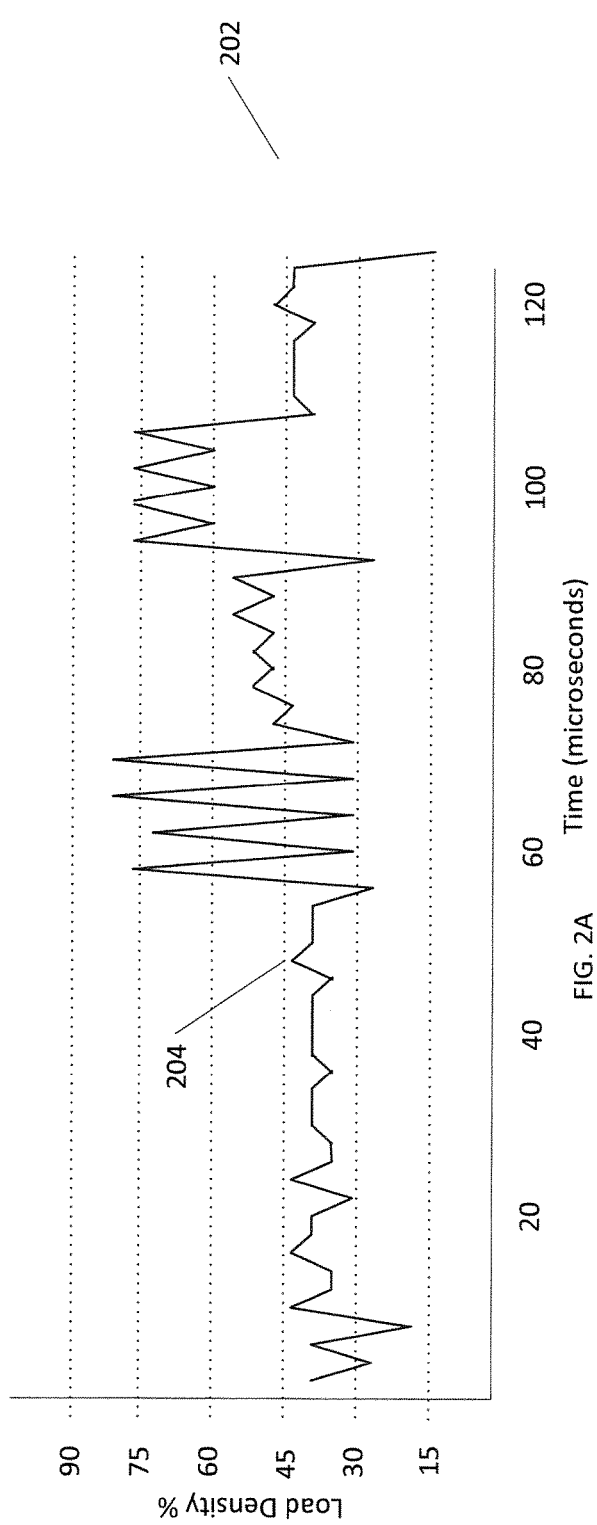
FIGS. 2A-2B illustrate example graph results from data input using a cache model for the processing device.
Figure 2B:
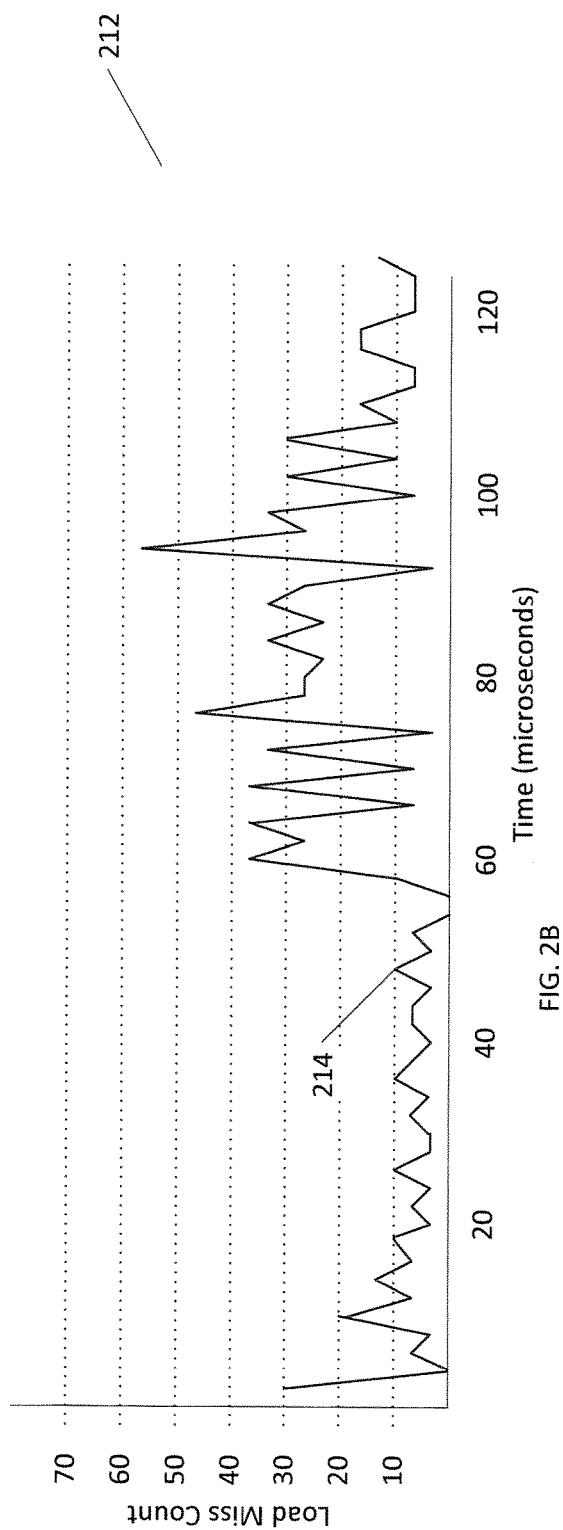

FIGS. 2A-2B show example graphs of analysis results generated by data mining analyzer 118 from data input to the cache model. FIG. 2A shows a graph 202 providing a load density curve 204 for a given processing device 101. Load density curve 204 corresponds to a percentage of density of data load (read) actions per one thousand core instructions over an interval of time. The load density is the number of load operations divided by the associated number of core instructions. Each data point in load density curve 204 provides a percentage of load density that occurred over the previous two-microsecond interval period. FIG. 2B shows a graph 212 providing a cache miss curve 214 for the given processing device 101. Cache miss curve 214 indicates the cache miss counts of load (read) operations per one thousand core instructions over an interval of time. Each data point in cache miss curve 214 provides a number of cache misses that occurred over the previous two-microsecond interval period. Graphs 202 and 212 indicate when and how intensive the core is engaged in computation and/or data processing for a given processing device 101.

Trace accumulator 116 obtains traces from processing device 101 known as Instruction-Accurate (IA) traces. IA traces record what instructions are performed by processing device 101 without any associated timing information. IA traces cannot be used directly for Cycle-Accurate (CA) trace simulation and analysis. CA traces record what instructions are performed by processing device 101 and when (in cycles) the instructions are performed. CA traces can be derived from IA traces by inputting the IA trace information into a processing core model to generate timing information associated with the IA traces. The timing information is combined with the IA trace information to create the CA traces. Micro-architecture effects of the core model may also be taken into account for additional analysis. Micro-architecture effects of the core model include register interlock, fetch buffer, instruction replay, and branch delay. As a result, CA trace information may be derived from a combination of the IA traces together with the micro-architecture of the core model so that IA traces may be translated into CA traces necessary for accurate and relevant system information.

Figure 3:
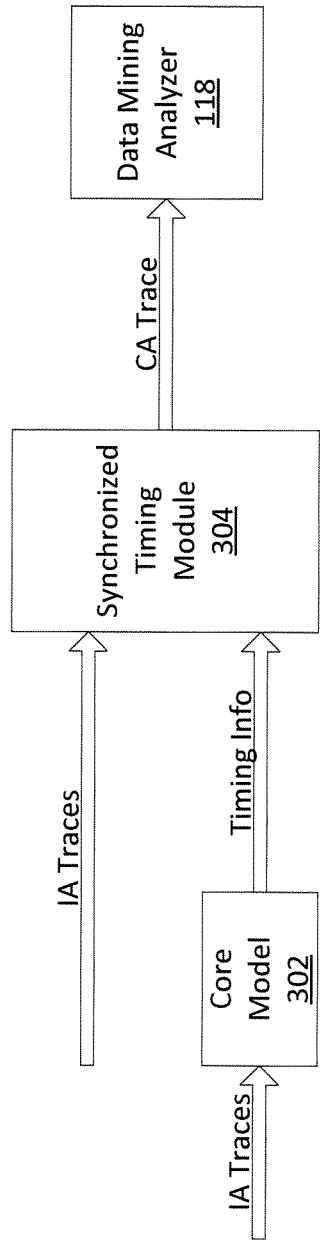
FIG. 3 illustrates an example system for creating a Cycle-Accurate trace from an Instruction-Accurate trace.

FIG. 3 shows an example of creating a CA trace from the IA trace. IA trace information obtained from trace accumulator 116 is input into a processing core model 302. Processing core model 302 simulates the operation of processing core 102 and creates timing information not present in the IA trace information. A synchronized timing module 304 synchronizes the timing information to the IA trace information, creating the CA trace. The CA trace is provided as an input, as well as the IA trace, to data mining analyzer 118 for analysis.

With the information obtained through data mining of the core traces, system information on the attributes of memory profiling, throughput of data flow, workload, preemption, and power usage can be extrapolated for analysis. Memory profiling and throughput of data flow is derived from the IA traces. Workload, preemption, and power usage is derived from the CA traces. Such system information yields an insightful blueprint for next-generation architecture exploration by providing how a processing device 101 performs during operation. Analysis of memory profiling, data flow throughput, workload, preemption, and power usage from current system design is incorporated into the design of a more efficient next-generation architecture.

For the memory profiling attribute, with load/store information available from the core IA traces, accurate information on memory usage can be derived for various memory spaces including L2, L3, and DDR. An indication on how data is used is gained from the information on what cache/memory is accessed to retrieve or write data. The memory profiling analysis can also be individually applied to gene functions discussed below.

Figure 4:
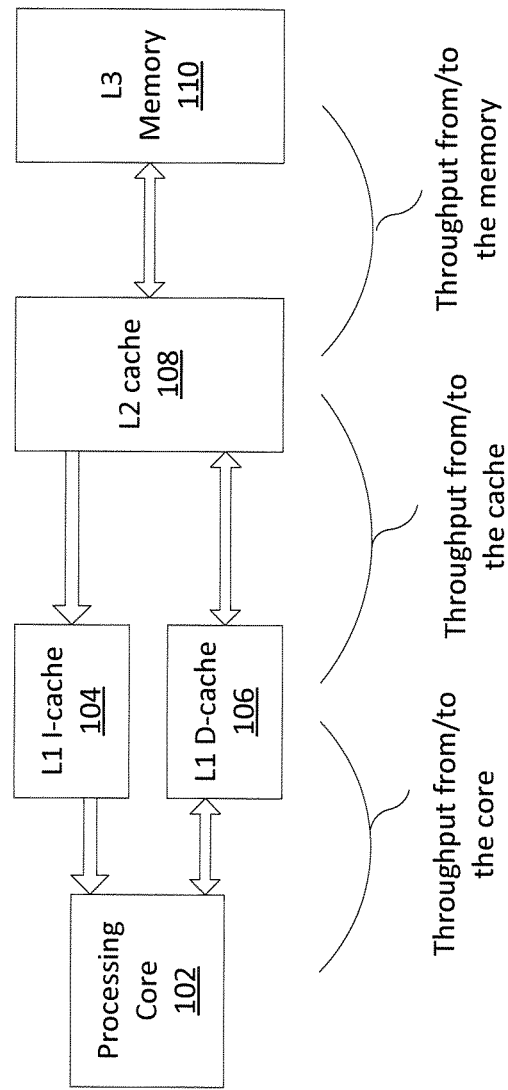
FIG. 4 illustrates the throughput points in the processing device.

FIG. 4 shows the throughput points in the processing device 101. FIG. 4 depicts some of the elements of FIG. 1 showing data interconnects. For the throughput attribute, accurate information for data flow can be derived from the IA traces. Data flow information includes the throughput between the processing core 102 and the corresponding L1 I-cache 104, L1 D-cache 106, and L2 cache 108. Data flow information also includes throughput between the caches and a memory sub-system, such as L3 memory 110 and DDR memory 114. Typically, processing core 102 has direct access to L1 I-cache 104 and L1 D-cache 106. Information requested but not found in L1 I-cache 104 and L1 D-cache 106 is sequentially retrieved first from L2 cache 108 if present, next from L3 memory 110 if present, and finally from the DDR memory 114. The throughput information can be very useful for top-level token-based (i.e., IA trace) simulation and analysis as it identifies how the data flows to and from the caches and memories and the intensity of the data flow and the corresponding effect on system performance. The throughput information may lead to implementation of different wiring schemes in the next-generation design in order to adjust data flow intensity. The data flow information can also be individually applied to gene functions discussed below.

For the workload attribute, an estimate on workload for each core can be derived from the CA traces. The factors in evaluating workload include baseline workload of cores from CA traces, L1 I-Cache 104 and L1 D-Cache 106 miss counts, and latency information from visits to various memory spaces like L2 cache 108, L3 memory 110, and DDR memory 114. The estimate of workload can be individually applied to gene functions discussed below.

For the power usage attribute, an estimate of power usage can be derived from the CA traces based on the counts of load/store and Arithmetic Logic Unit (ALU) operations like (scalar and vector) addition, multiplication, etc. The estimate of power usage can be individually applied to gene functions discussed below.

The preemption attribute is associated with context switches interrupting one task to perform another task. Preemption happens in practical communications systems mainly to meet timing requirements. Information related to preemption would be very helpful and insightful to learn how often, how long, and the cost effect of preemption in realistic communication practice.

Figure 5:
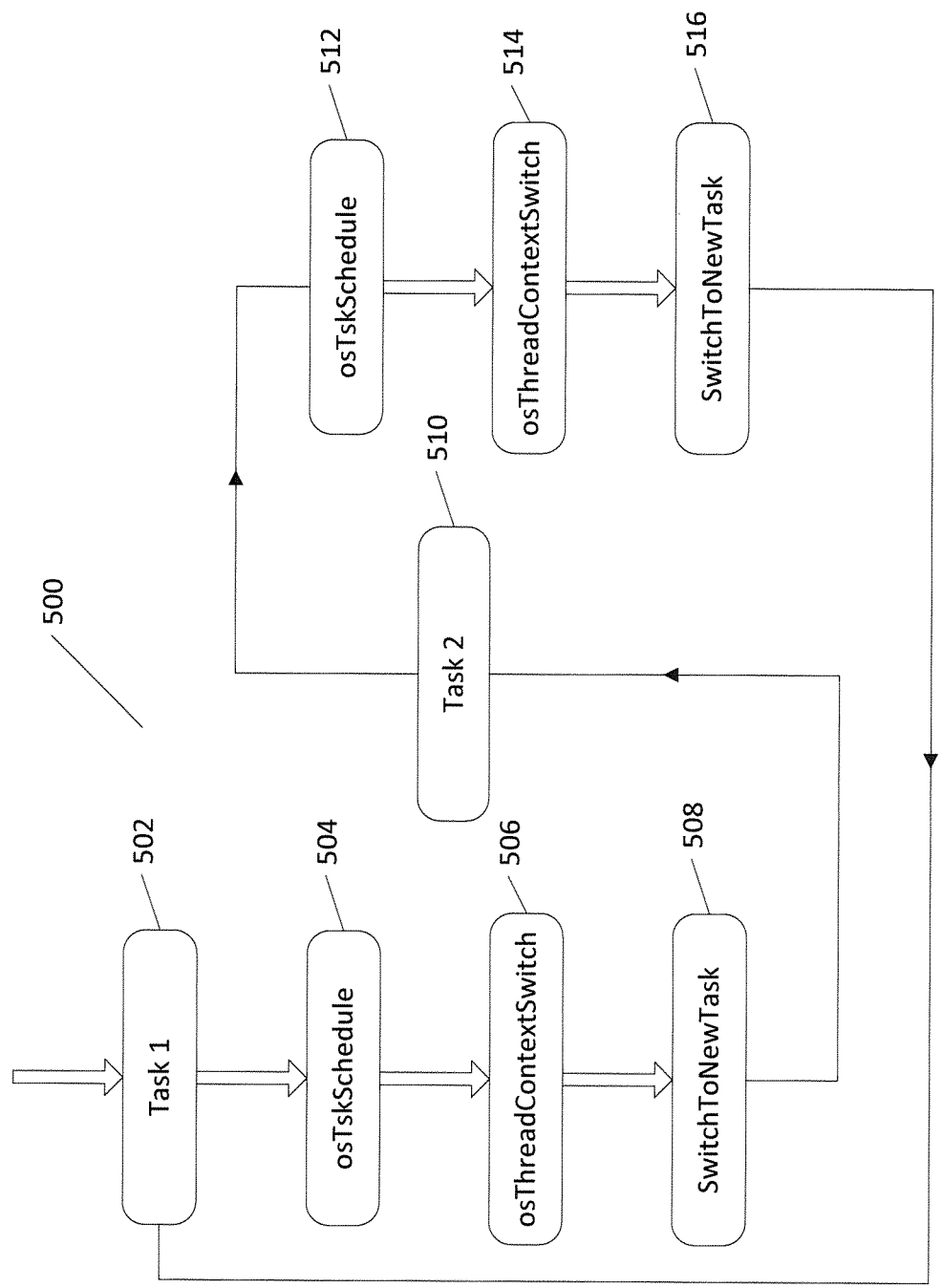
FIG. 5 illustrates a preemption scenario detected from a core trace.

FIG. 5 shows how a preemption scenario 500 is detected from a core trace. To begin, a certain task, Task 1 502, is being processed. Operating system (OS) functions at the user level like 'osTskSchedule' 504, 'osThreadContextSwitch' 506, and 'SwitchToNewTask' 508 appear in the trace that invoke a context switch to suspend Task 1 502 before it finishes. These functions identify when one task is preempted by another higher priority task. Function 'osTskSchedule' 504 indicates which task is scheduled to be performed and that a new higher priority or timing critical task is to be scheduled before the current task can finish. Function 'SwitchToNewTask' 508 informs processing core 102 that the new task is to be performed prior to finishing the current task according to the scheduling. Function 'osThreadContextSwitch' 506 performs the context switch to the new task and saves the data to memory and at the point where the current task is preempted. A new Task 2 510 is then executed to satisfy a preemption event. Similar OS functions 'osTskSchedule' 512, 'osThreadContextSwitch' 514, and 'SwitchToNewTask' 516 appear in the trace upon completion of Task 2 510 to indicate a context switch and return the process back to Task 1 502. By identifying these functions in the trace, the occurrence, length, and frequency of task preemption can be tracked.

Figure 6:
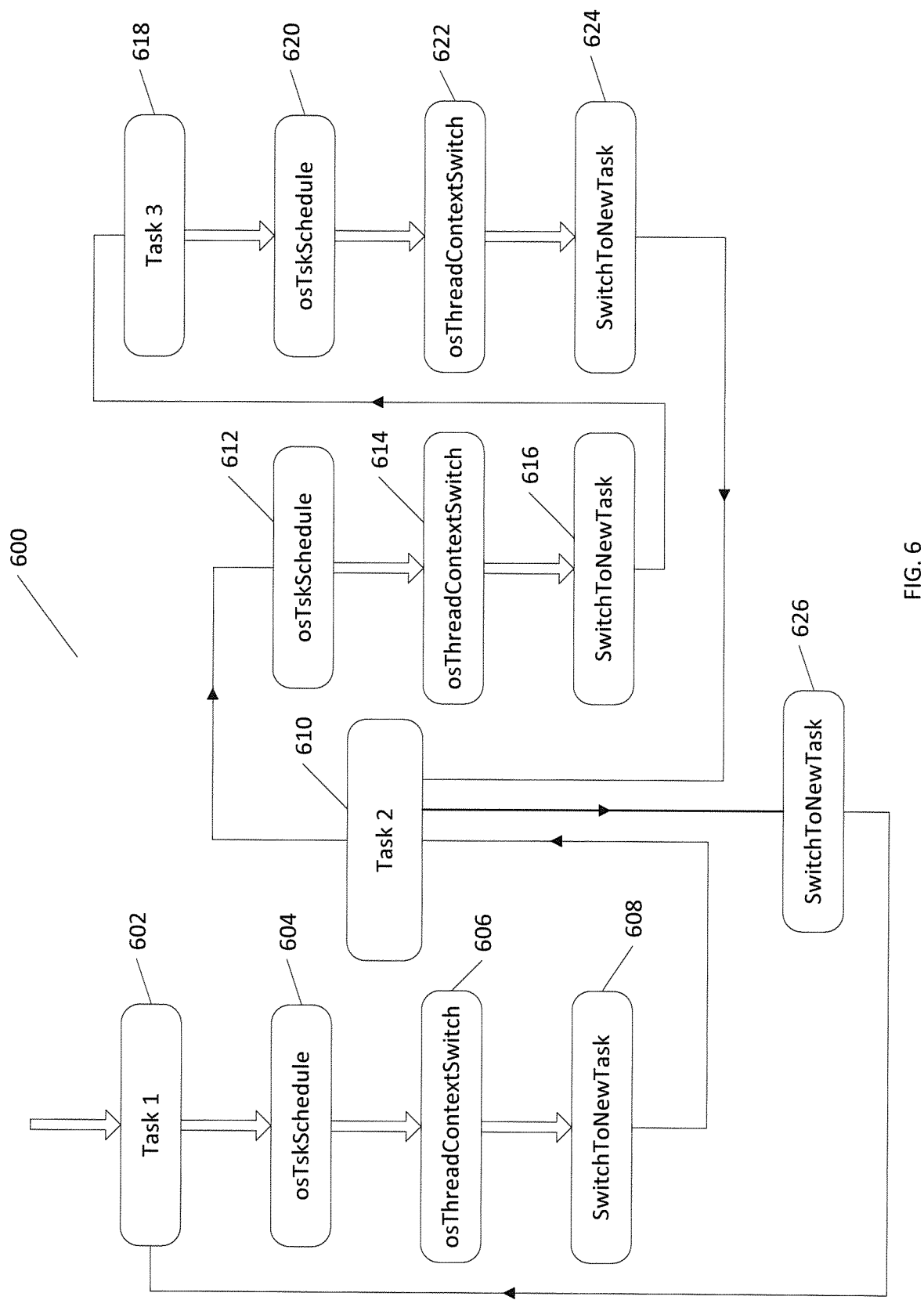
FIG. 6 illustrates a two-loop preemption scenario.

FIG. 6 shows a two-loop preemption scenario 600. To begin, a certain task, Task 1 602, is being processed. Upon a first preemption event, OS functions 'osTskSchedule' 604, 'osThreadContextSwitch' 606, and 'SwitchToNewTask' 608 appear in the trace to suspend Task 1 602 before it finishes. A new Task 2 610 is then executed to satisfy the first preemption event. Upon a second preemption event, OS functions 'osTskSchedule' 612, 'osThreadContextSwitch' 614, and 'SwitchToNewTask' 616 appear in the trace to suspend Task 2 610 before it finishes. A new Task 3 618 is then executed to satisfy the second preemption event. OS functions 'osTskSchedule' 620, 'osThreadContextSwitch' 622, and 'SwitchToNewTask' 624 appear in the trace upon completion of Task 3 618 to return the process back to Task 2 610. Task 2 610 completes its execution to satisfy the first preemption event and returns the process back through OS function 'SwitchToNewTask' 626 to Task 1 602 for completion. Operation can readily be extended to other multi-loop preemption scenarios.

Figure 7:
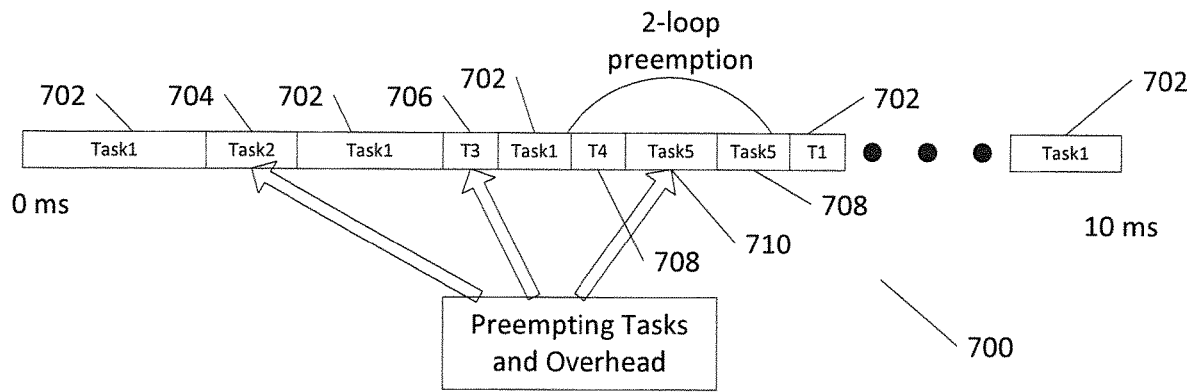
FIG. 7 illustrates a trace flow including preemption events used in evaluating preemption cost.

FIG. 7 shows a trace flow 700 including preemption events in evaluating preemption cost. A first task 702 is processed before being preempted by a second task 704. Upon completion of second task 704, first task 702 resumes being processed before being preempted by third task 706.

Upon completion of third task 706, first task 702 resumes being processed before being preempted by fourth task 708. Before fourth task 708 is a completed, a fifth task 710 occurs and preempts fourth task 708, creating the two loop preemption event. Upon completion of fifth task 710, fourth task 708 resumes to completion followed by resumption of first task 702 processing. First task 702 proceeds to completion subject to any further preempting tasks. There may be hundreds or thousands of tasks being performed in a 10 ms interval subject to preemption events.

The cost of a preemption event is defined by a size of the preempting task plus overhead. Size is defined by the number of instructions or cycles. Overhead includes those OS function instructions used to start and end preemption. The overhead instructions aid in identifying a preemption event and are derived from the core trace. Information about preemption cost is useful to decide if preemption is really necessary and, in case necessary, determine the impact (latency introduced) to the preempted task. Based on the preemption cost for each preemption event, the preemption percentage of a trace is defined to be the sum, for all preemption events, of the size of each preempting task plus overhead, divided by the size of the trace. A preemption cost that is above a certain threshold may lead to changes in the sequence of instructions in order to reduce the preemption cost. An automated scheme may be used to estimate the preemption cost and percentage in number of cycles. The core trace is analyzed to identify the preemption event through the associated overhead function instructions and initiate a determination of the preemption cost estimate and percentage. The preemption event can then be analyzed to identify why it occurred, whether it is necessary, and its effect on system performance.

The data mining of core traces can be applied to individual functions executed in the system. A function library database may be generated with a list of key fundamental functions performed by processing device 101 during instruction execution, coined herein as gene functions. Gene functions, as identified below, are indicated by functional blocks in a top-level system design data flow. The gene function library database is used to establish a foundation for a systematic, efficient, and automated design environment for next-generation system design.

In general, a gene function library database is generated by data mining analyzer 118 according to gathering of information from a core trace at the instruction level, transforming the instruction-level trace into a hierarchical function format, identifying gene functions in the hierarchical function format, and deriving attributes for the gene functions for entry in the gene function library database. The attributes of gene functions for inclusion in the gene function library database are derived from the hierarchical function format and core trace. These attributes include memory usage, data throughput, workload, preemption, power usage, etc., as discussed above.

The following data is gathered to establish the gene function library—core traces and function symbol tables. Core traces provide information on instruction addresses, time stamps of instructions, load (read) and store (write) operations, data location, and data size. Function symbol tables map each instruction address in the trace to an application or OS function.

Figure 8:
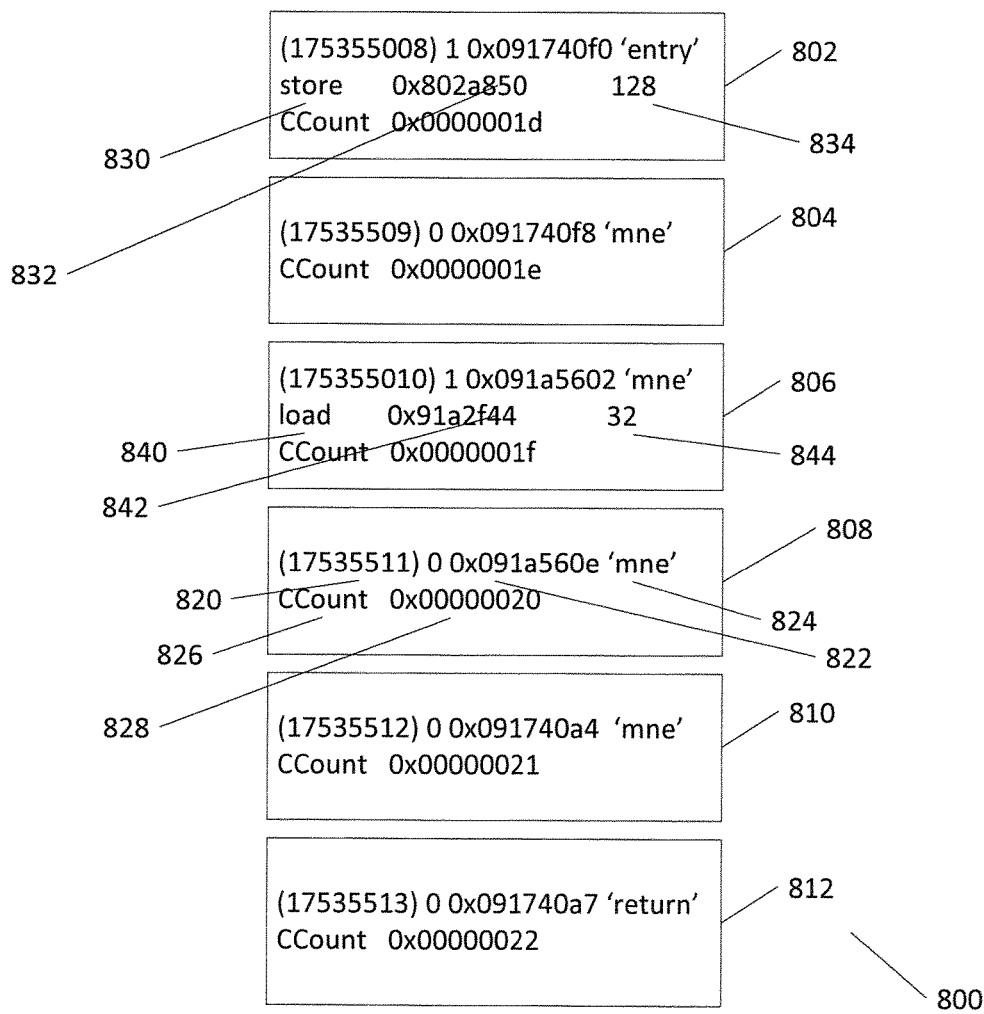
FIG. 8 illustrates an example core trace.

FIG. 8 shows an example of a partial core trace 800. In general, a core trace is generated on the instruction level. Core trace 800 includes example instructions 802-812 executed in a processing device 101. Each instruction includes a sequence number 820, an instruction address 822, a command mnemonic 824, and a cycle count (CCount) 826 with a corresponding count value 828. Instruction 802 also includes a store operation 830 identifying an address 832 and a store value 834 written therein. Instruction 806 includes a load operation 840 identifying an address 842 and a load value 844 read therefrom. The instructions are gathered in real time and made available for post processing and analysis. Using the function symbol tables, the trace can be transformed from the instruction level to the APP/OS function level. A ratio of the number of functions to the number of instructions in the trace is about 1 to 100. For illustrative purposes, core trace 800 is shown with a single function and six instructions although other numbers of functions and instructions are possible. In addition, using the command mnemonics 'mne' of the instruction from the trace, like 'entry' in instruction 802 and 'return' in instruction 812 (to/from an invoked function), individual functions are identified and the trace can be transformed to a hierarchical function format.

Figures 9, 12:
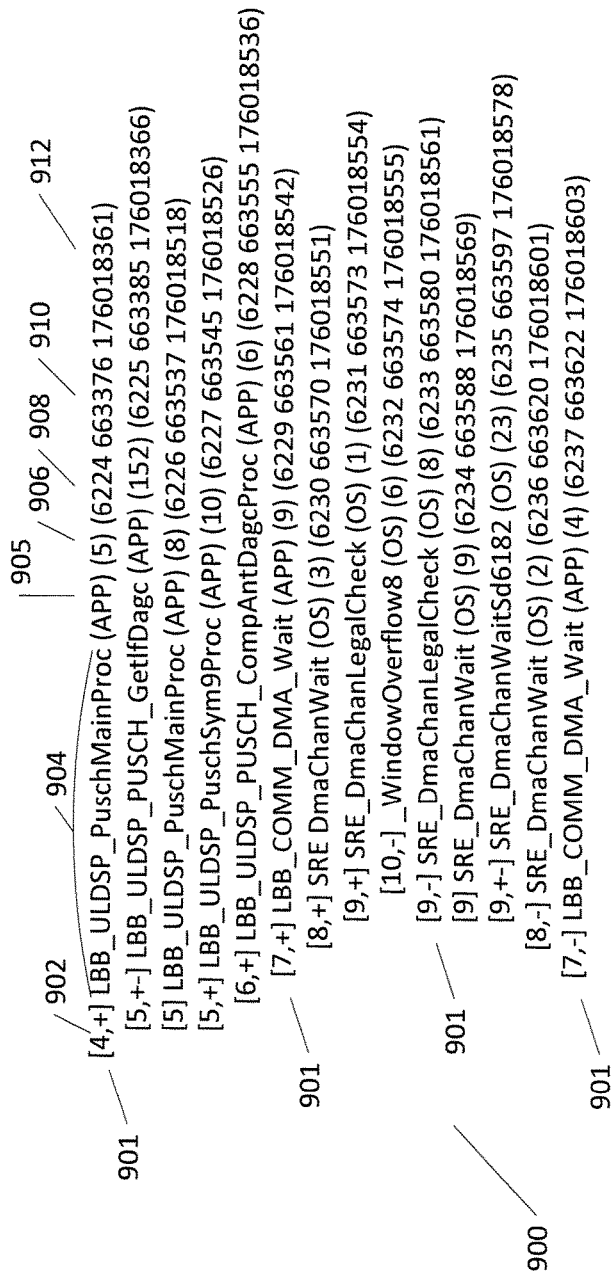
FIG. 9 illustrates an example hierarchical format created from the core trace.
FIG. 12 illustrates an example of a gene function in a hierarchical format.

FIG. 9 shows an example of a partial hierarchical function format 900 created by data mining analyzer 118 from a core trace like core trace 800 of FIG. 8. The core trace is analyzed by data mining analyzer 118 to identify individual functions processed by processing device 101. From the command mnemonics provided in each instruction, a function is identified and added to the hierarchical function format 900. Hierarchical function format 900 includes a plurality of function lines 901 each representing an individual function. Each function line 901 has a list of items indicating certain aspects of that function. In the hierarchical function format 900, the first field 902 in each line indicates the level of the function. For example, the function 'LBB_ULDSP_PuschMainProc' is level 4, while the function 'LBB_ULDSP_PuschSym9Proc' is level 5 as it is called by 'LBB_ULDSP_PuschMainProc'. A plus (+) sign means the current function invokes another function. A minus (−) sign indicates a return back to the calling function. The second field 904 indicates a name of the function. The third field 905 indicates a function type. The terms APP and OS mean the function is an 'Application' or 'OS' function. The fourth field 906 is an instruction number indicating the number of instructions associated with the function. The fifth field 908 is an order number indicating the sequential order of the function in the trace. For example, the first function line 901 shows, 'LBB_ULDSP_PuschMainProc' 904 as the 6,224th function. The sixth field 910 is an accumulated number indicating the accumulated number of instructions before this function is invoked. For example, there are 663,376 instructions in total before the function 'LBB_ULDSP_PuschMainProc' 904 is invoked. The seventh field 912 is a start number indicating the starting instruction number in the original trace by which it is straightforward to locate where the function starts (and ends). Gene functions are matched from the hierarchical function format 900 and the attributes for the gene functions are derived from the core trace and the hierarchical function format for entry into the gene function library database.

Figure 10:
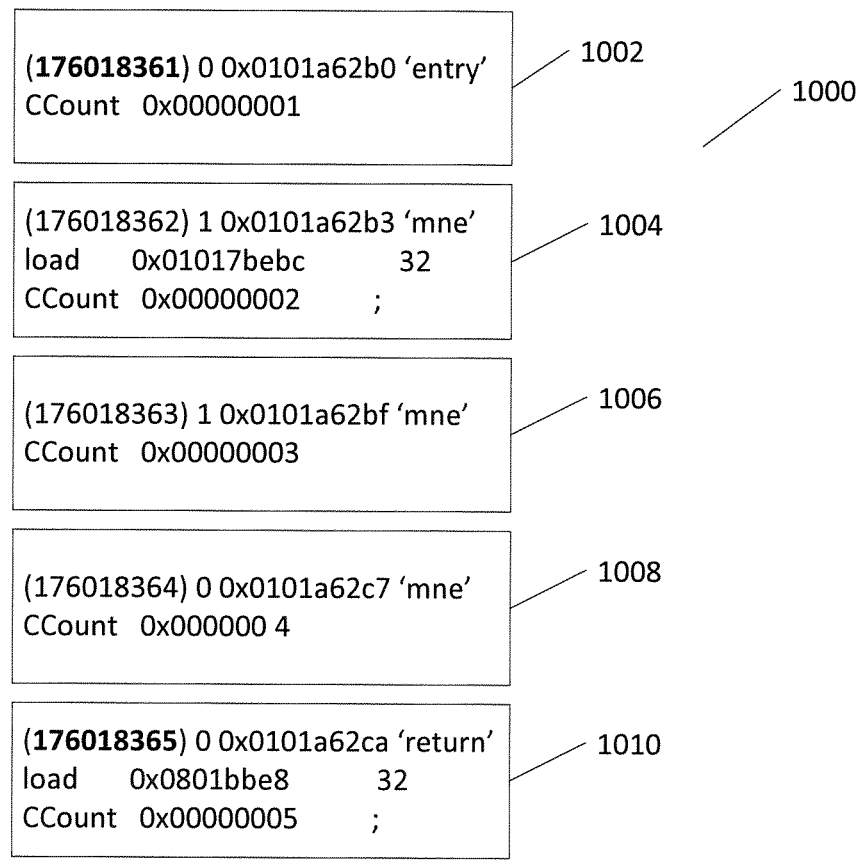
FIG. 10 illustrates an example of a core trace associated with a gene function.

FIG. 10 shows an example of a core trace 1000 associated with an example gene function. From a system level design data flow diagram, discussed below, the function 'LBB_ULDSP_PuschMainProc' is identified as a gene function. The gene function is matched to a function line 901 in the hierarchical function format 900 of FIG. 9. In this example, the gene function 'LBB_ULDSP_PuschMainProc' is found in the top function line 901 of FIG. 9. Instructions 1002-1010 in core trace 1000 correspond to gene function 'LBB_ULDSP_PuschMainProc'. A gene function is mainly defined by the name of the gene function, the number of loads and stores, memory usage, data flow, workload, preemption, and power usage associated with the gene function. The corresponding segment of instructions in the original trace defined by the 'start' and 'end' instructions uniquely define the trace associated with the gene function for trace-based (CA) simulation. The gene function 'LBB_ULDSP_PuschMainProc' has the 'start' and 'end' instruction indexes '176018361' of instruction 1002 and '176018365' of instruction 1010 as provided in the original trace. The core trace 1000 is used in creating an entry in a gene function library database for gene function 'LBB_ULDSP_PuschMainProc' and deriving the attributes associated therewith. There may be more than one gene function associated with the same Application function due to various wireless communication scenarios.

Figure 11:
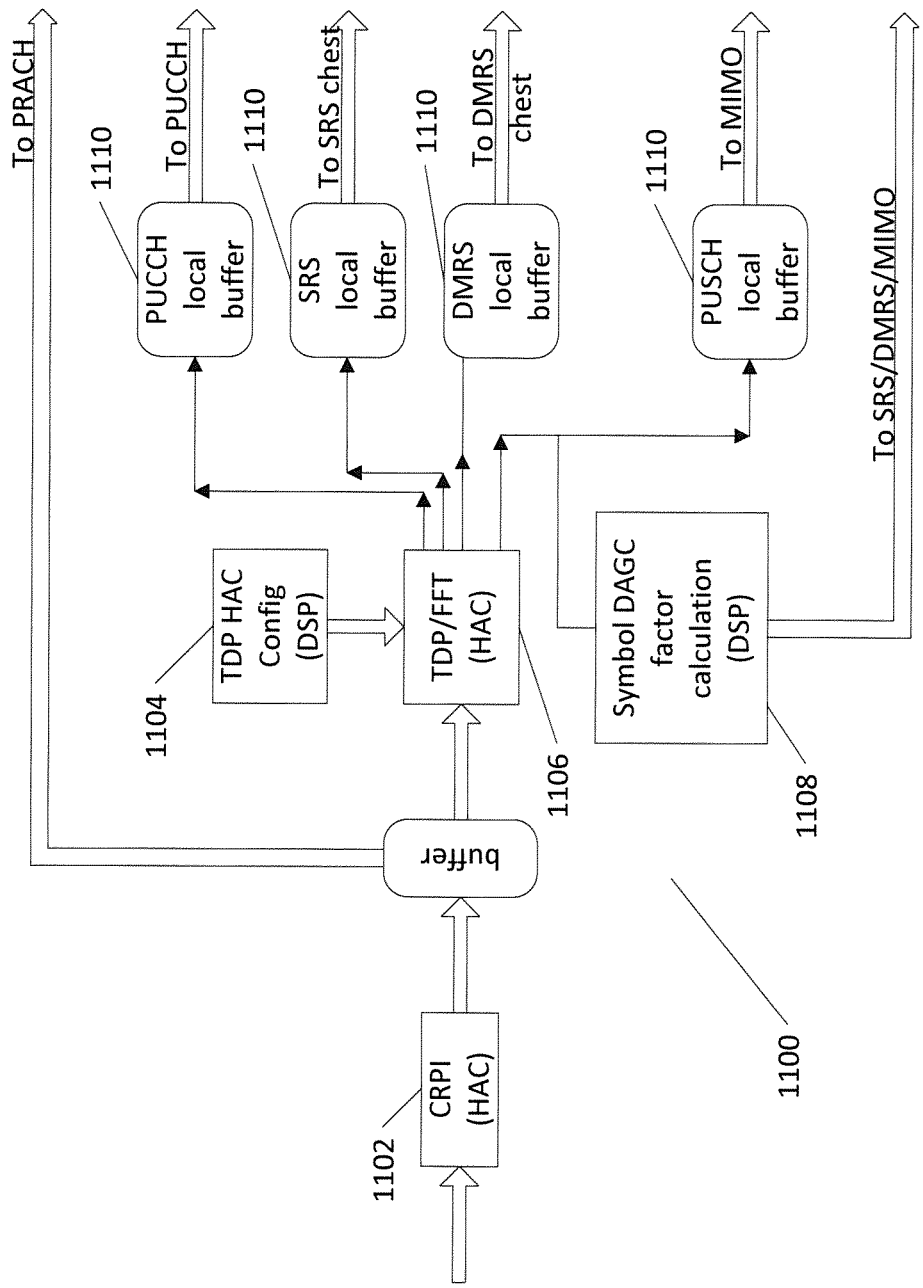
FIG. 11 illustrates an example of a data flow diagram in a top-level design.

FIG. 11 shows an example of a data flow diagram 1100 in a standard top-level system design of a typical wireless communication device associated with the instructions executed by processing device 101. Data flow diagram 1100 shows specific functionalities, or gene functions, performed in the standard system design of the wireless communication device. The gene functions shown in data flow diagram 1100 include a Common Public Radio Interface (CRPI) function 1102, time domain processing (TDP) hardware accelerator (HAC) Configuration function 1104, TDP and fast fourier transform (FFT) function 1106, and digital automatic gain control (DAGC) function 1108. The calculations performed by these gene functions and their interactions with each other and memory buffers 1110 can be used to build a gene function library of traces associated with each gene function. These types of functional blocks with flexible and adjustable granularities are fundamental and crucial elements in the system architecture, leading to the defining of corresponding gene functions to serve as the base and foundation for systematic exploration of new system architectures. As shown above, the gene functions, as determined in the system level design data flow such as data flow diagram 1100, are matched by data mining analyzer 118 to the hierarchical function format 900 and extracted therefrom for placement in the gene function library database. Each gene function may be divided into one or more sub-groups of gene functions for increased granularity of the analysis. From the core trace, information for each gene function associated with the attributes discussed above is derived for insertion into the gene function library database. For each gene function, the gene function library database includes information such as how much data was used by the gene function, the data throughput associated with the gene function, the workload of the gene function, how much power is consumed by the gene function, and the occurrence of a preemption event during gene function processing.

FIG. 12 shows an example of a partial hierarchical function format 1200 that only indicates a number of times that a specific gene function (in this example Ruu) is found. For illustrative purposes, as an example, the Ruu function block is related to the APP 'LBB_ULDSP_PUSCH_RuuMainProc' function derived from the core trace. Therefore, to define the Ruu gene function, creating the gene function library database entry starts with the listing of all occurrences of the 'LBB_ULDSP_PUSCH_RuuMainProc' gene function in the core trace transformed into the hierarchical function format regardless of when this gene function occurs in the trace. From the hierarchical function format, the when, where, and how for invoking this gene function can be derived as well as what functional operations they perform. In this manner, a specific gene function can be analyzed on an individual basis.

A gene function library database may be built for token-based (IA trace) and trace-based (CA trace) system simulation and exploration. For the token-based simulation of the system, the accurate information of memory usage, data flow, workload and power usage of the corresponding gene functions are indispensable to obtain meaningful simulation results. Token-based simulation provides a performance model of a system's architecture that represents data transfers abstractly as a set of simple symbols called tokens. Neither the actual application data nor the transforms on it are described other than that required to control the sequence of events in time. Token based simulation avoids large trace storage requirements by interleaving execution of the program and simulation of the architecture. The application data is not modeled and only the control information is modeled. Typically, token-based simulation resolves the time for a multiprocessor networked system to perform major system functions. Token-based simulation keeps track of the usage of resources such as memory buffer space, communication linkages, and processor units. The structure of the network is described down to the network node level. The network nodes include processor elements, network switches, shared memories, and I/O units. The internal structure of the network nodes is not described in a token-based simulation.

Figure 13:
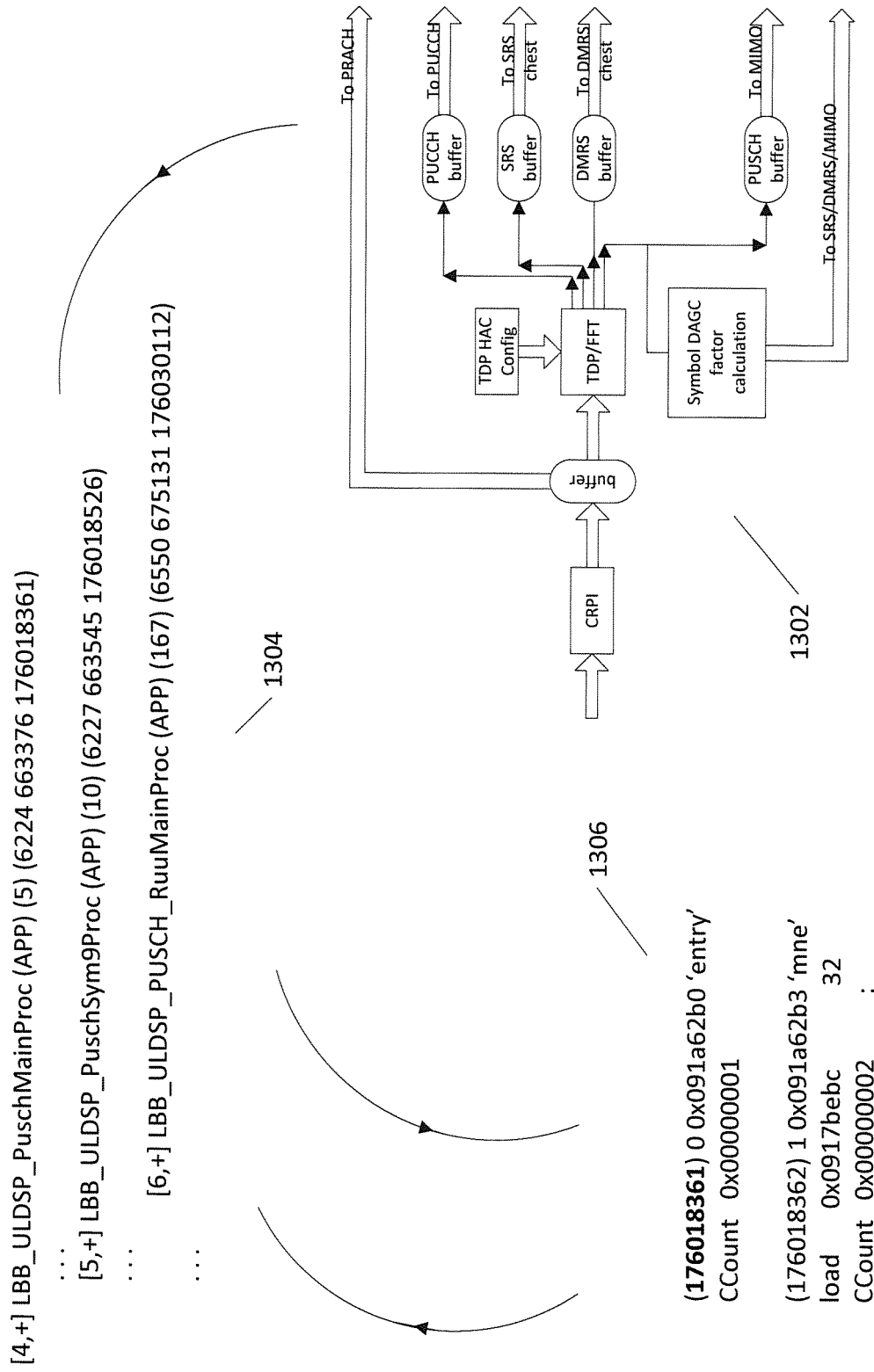
FIG. 13 illustrates an application of a gene function library database to trace-based simulations.

FIG. 13 shows a relationship between top level system design data flow 1302, a hierarchical function format 1304, and a core trace of instructions 1306 for an application of the gene function library database to trace-based simulations. Trace-based simulation refers to system simulation performed by looking at traces of program execution or system component access on a cycle by cycle basis for the purpose of performance prediction. Trace-based simulation may be used in a variety of applications, including the analysis of message passing performance on very large computer clusters. Traced-based simulators usually have two components: one that executes actions and stores the results (i.e., traces) and another which reads the log files of traces and interpolates them to new (and often more complex) scenarios. For instance, in the case of large computer cluster design, the execution takes place on a small number of nodes and traces are left in log files. The simulator reads those log files and simulates performance on a much larger number of nodes, thus providing a view of the performance of very large applications based on the execution traces on a much smaller number of nodes The core trace of instructions 1306 are derived from IA trace information and derived CA trace information. The hierarchical function format 1304 is generated through analysis of the core trace of instructions 1306. The top level system design data flow 1302 identifies the gene functions for inclusion in the gene function database. The gene functions from the top level system design data flow 1302 are matched to functions in the hierarchical function format 1304. The particular instructions associated with each gene function are used to derive the attributes for inclusion in the gene function database. The trace associated with the gene function is used for CA (Cycle-Accurate) simulation of the system design. Memory usage, data throughput, workload, preemption, and power usage as discussed above may be derived and evaluated for each gene function on an individual basis for top-level analysis and simulation. The preemption of gene functions may be detected and a preemption cost and percentage associated with a particular gene function can be determined in the manner discussed above.

Figure 14:
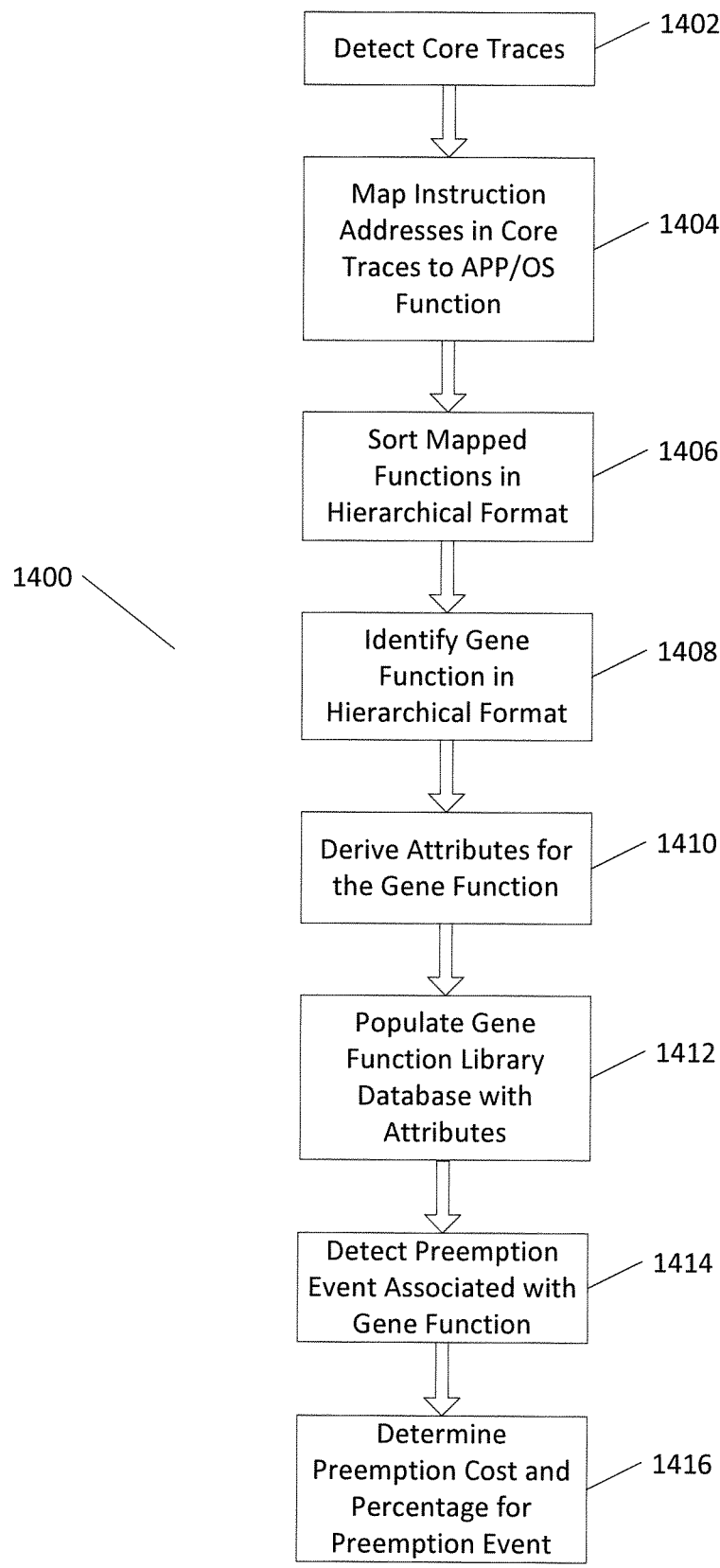
FIG. 14 illustrates a process for data mining from core traces.

FIG. 14 shows a process 1400 for data mining from core traces based on the features discussed above. Process 1400 begins at block 1402 where one or more core traces are detected to identify a sequence of instruction execution. In block 1404, instruction addresses in the core traces are mapped to appropriate Application and OS functions. The mapped functions are sorted in block 1406 in a hierarchical format. One or more gene functions are identified from the hierarchical format in block 1408. For each gene function, attributes are derived from the hierarchical format and core traces in block 1410. A gene function library database is populated in block 1412 with entries for each gene function including the attributes derived in block 1410. Further detection of a preemption event for a particular gene function may be performed in block 1414. Upon detecting a preemption event, a preemption cost and percentage associated with the gene function being preempted is determined at block 1416.

Figure 15:
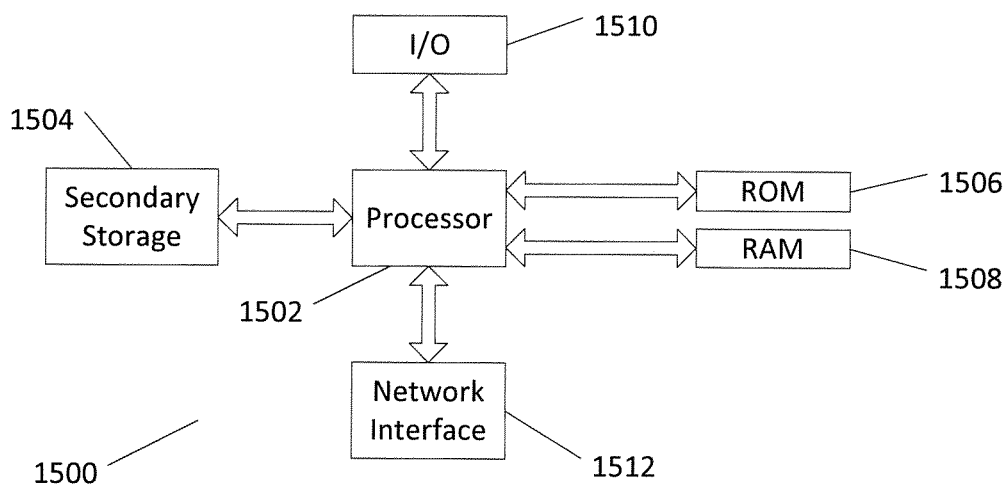
FIG. 15 illustrates an example of a computing component suitable for implementing one or more embodiments disclosed herein.

FIG. 15 illustrates a simplified example of a general-purpose computing component 1500 suitable for trace accumulator 116 and data mining analyzer 118 in implementing one or more embodiments disclosed herein. The features described above for detecting core traces through generation of a gene function library database may be implemented on any general-purpose computing component, such as a computer or network component with sufficient processing power, memory resources, and network throughput capability to handle the necessary workload placed upon it. Computing component 1500 may be implemented in trace accumulator 116 and data mining analyzer 118 to perform the features described herein. The computing component 1500 includes a processor 1502 (which may be referred to as a central processor unit or CPU) that is in communication with memory devices including secondary storage 1504, read only memory (ROM) 1506, random access memory (RAM) 1508, input/output (I/O) devices 1510, and network/component connectivity devices 1512. The processor 1502 may be implemented as one or more CPU chips, or may be part of one or more application specific integrated circuits (ASICs).

The secondary storage 1504 is typically comprised of one or more disk drives or tape drives and is used for non-volatile storage of data and as an over-flow data storage device if RAM 1508 is not large enough to hold all working data. Secondary storage 1504 may be used to store programs that are loaded into RAM 1508 when such programs are selected for execution. The ROM 1506 is used to store instructions and perhaps data that are read during program execution. ROM 1506 is a non-volatile memory device that typically has a small memory capacity relative to the larger memory capacity of secondary storage 1504. The RAM 1508 is used to store volatile data and perhaps to store instructions. Access to both ROM 1506 and RAM 1508 is typically faster than to secondary storage 1504. The gene function library database may be maintained in secondary storage 1504 or RAM 1508. Additional processors and memory devices may be incorporated based on the function of each component within trace accumulator 116 or data mining analyzer 118.

In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. Upon execution, the computer program may detect core traces, convert the core traces into a hierarchical format, generate the gene function database, and determine preemption costs associated with the gene functions.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to and readily discernable by those skilled in the art. Accordingly, the above description of example embodiments does not define or constrain this disclosure. Other changes, substitutions, and alterations are also possible without departing from the scope of this disclosure as defined by the following claims.

What is claimed is:

1. A computer-implemented method for data mining from core traces in a processing system for wireless baseband design, the method comprising:
   detecting a core trace in the processing system by an accumulator, the core trace being a sequence of instructions executed in the processing system;
   mapping instruction addresses in the core trace to one or more functions of the processing system using a function symbol table;
   sorting the mapped functions into a hierarchical format;
   identifying a gene function in the hierarchical format, by a data analysis engine, the gene function comprising a fundamental function executed by the processing system and defined by a name, number of loads and stores, memory usage, data flow, workload, pre-emption and power usage, and wherein the gene function is executed as one of the sequence of instructions executed by one or more processors in the processing system;
   deriving attributes for the gene function from the hierarchical format, the attributes including at least memory usage, data throughput, workload, pre-emption and power usage of the gene function, the power usage of the processing system during instruction execution, the power usage being derived from counts of load/store and Arithmetic Logic Unit (ALU) operations;
   detecting a pre-emption event based on the core trace during execution of the gene function by the one or more processors, wherein a percentage of the core trace attributable to the pre-emption event is defined as a sum, for all pre-emption events, of a size of first and second pre-empting tasks plus overhead, divided by the size of the core trace;
   and determining a cost attributable to the pre-emption event by the data analysis engine, the cost of the pre-emption event having an impact on processing latency of at least the first pre-emption task, and, based on the cost attributable to the pre-emption event exceeding a threshold, changing an order of the sequence of instructions to thereby reduce the pre-emption cost, wherein the cost of the pre-emptive event is determined as a size of the first pre-emption task plus overhead, where the size is defined by a number of instructions in the sequence of instructions and the overhead includes operating system instructions used to start and end the pre-emption event and is derived from the core trace.

2. The computer-implemented method of claim 1, wherein the core trace includes instruction addresses, time stamps, load/store operations, data location, and data size.

3. The computer-implemented method of claim 1, further comprising:
storing the attributes into a gene function library database using the function symbol table.

4. The computer-implemented method of claim 3, wherein the memory usage is memory usage utilized by the processing system with respect to various memory spaces during instruction execution, the memory usage being derived from load/store instruction information in the core trace.

5. The computer-implemented method of claim 3, wherein one of the derived attributes is throughput within the processing system during instruction execution, the throughput being derived from data flow information exchanged between a central processing core and a cache and data flow information exchanged between the cache and a memory sub-system.

6. The computer-implemented method of claim 3, the workload is workload of the processing system during instruction execution, the workload being derived from baseline workload of cores from Cyclic-Accurate traces, cache miss counts, and latency information from visits to various memory spaces.

7. The computer-implemented method of claim 1, wherein the one or more functions of the processing system are one or more application or operating system functions.

8. The computer-implemented method of claim 1, further comprising:
invoking a context switch to suspend the first pre-empting task prior to completion and switch to a second pre-empting task;
storing data for the first pre-empting task to memory at a point of suspension; and
execution the second pre-empting task.

9. The computer-implemented method of claim 1, wherein the accumulator is a trace accumulator that obtains the core traces from the one or more processors record instructions being performed and cycles in which the instructions are being performed.

10. The non-transitory computer-readable medium of claim 9, wherein the one or more processors are further caused to:
store the attributes into a gene function library database.

11. An apparatus for data mining from core traces in a processing system for wireless baseband design, comprising:
a non-transitory memory storage comprising instructions; and
one or more processors in communication with the memory, wherein the one or more processors execute the instructions to:
detect a core trace in the processing system, by an accumulator the core trace being a sequence of instructions executed in the processing system;
map instruction addresses in the core trace to one or more functions of the processing system;
sort the mapped functions into a hierarchical format;
identify a gene function in the hierarchical format, by a data analysis engine, the gene function comprising a fundamental function executed by the processing system and defined by a name, number of loads and stores, memory usage, data flow, workload, pre-emption and power usage, and wherein the gene function is executed as one of the sequence of instructions executed by one or more processors in the processing system;
derive attributes for the gene function from the hierarchical format, the attributes including at least memory usage, data throughput, workload, pre-emption and power usage of the gene function, the power usage of the processing system during instruction execution, the power usage being derived from counts of load/store and Arithmetic Logic Unit (ALU) operations;
detect a pre-emption event based on the core trace during execution of the gene function by the one or more processors, wherein a percentage of the core trace attributable to the pre-emption event is defined as a sum, for all pre-emption events, of a size of first and second pre-empting tasks plus overhead, divided by the size of the core trace; and
determine a cost attributable to the pre-emption event by the data analysis engine, the cost of the pre-emption event having an impact on processing latency of at least the first pre-emption task, and, based on the cost attributable to the pre-emption event exceeding a threshold, change an order of the sequence of instructions to thereby reduce the pre-emption cost, wherein the cost of the pre-emptive event is determined as a size of the first pre-emption task plus overhead, where the size is defined by a number of instructions in the sequence of instructions and the overhead includes operating system instructions used to start and end the pre-emption event and is derived from the core trace.

12. The apparatus of claim 11, wherein the core trace includes instruction addresses, time stamps, load/store operations, data location, and data size.

13. The apparatus of claim 11, wherein the one or more processors further execute the instructions to:
store the attributes into a gene function library database using the function symbol table.

14. The apparatus of claim 13, wherein the memory usage utilized by the processing system with respect to various memory spaces during instruction execution, the memory usage being derived from load/store instruction information in the core trace.

15. The apparatus of claim 13, wherein one of the derived attributes is throughput within the processing system during instruction execution, the throughput being derived from data flow information exchanged between a central processing core and a cache and data flow information exchanged between the cache and a memory sub-system.

16. The apparatus of claim 13, wherein the workload is workload of the processing system during instruction execution, the workload being derived from baseline workload of cores from Cyclic-Accurate traces, cache miss counts, and latency information from visits to various memory spaces.

17. A non-transitory computer-readable medium storing computer instructions for data mining from core traces in a processing system for wireless baseband design, that when executed by one or more processors, cause the one or more processors to:

detect a core trace in the processing system by an accumulator, the core trace being a sequence of instructions executed in the processing system;

map instruction addresses in the core trace to one or more functions of the processing system;

sort the mapped functions into a hierarchical format;

identify a gene function in the hierarchical format, by a data analysis engine, the gene function comprising a fundamental function executed by the processing system and defined by a name, number of loads and stores, memory usage, data flow, workload, pre-emption and power usage, and wherein the gene function is executed as one of the sequence of instructions executed by one or more processors in the processing system;

derive attributes for the gene function from the hierarchical format, the gene function defined by a name, number of loads and stores, memory usage, data flow, workload, pre-emption and power usage, and the power usage of the processing system during instruction execution, the power usage being derived from counts of load/store and Arithmetic Logic Unit (ALU) operations;

detect a pre-emption event based on the core trace during execution of the gene function by the one or more processors, wherein a percentage of the core trace attributable to the pre-emption event is defined as a sum, for all pre-emption events, of a size of first and second pre-empting tasks plus overhead, divided by the size of the core trace; and determine a cost attributable to the pre-emption event by the data analysis engine, the cost of the pre-emption event having an impact on processing latency of at least the first pre-emption task, and, based on the cost attributable to the pre-emption event exceeding a threshold, change an order of the sequence of instructions to thereby reduce the pre-emption cost, wherein the cost of the pre-emption event is determined as a size of first pre-empting task plus overhead, where the size is defined by a number of instructions in the sequence of instructions and the overhead includes operating system instructions used to start and end the pre-emption event and is derived from the core trace.

* * * * *

UNITED STATES PATENT AND TRADEMARK OFFICE
CERTIFICATE OF CORRECTION

PATENT NO. : 11,636,122 B2
APPLICATION NO. : 14/983934
DATED : April 25, 2023
INVENTOR(S) : YwhPyng Harn et al.

It is certified that error appears in the above-identified patent and that said Letters Patent is hereby corrected as shown below:

In the Claims

Column 13, Line 47 (Claim 8, Line 8) please replace "execution the" with --executing the--

Signed and Sealed this
Twenty-seventh Day of June, 2023

Katherine Kelly Vidal
*Director of the United States Patent and Trademark Office*